UNITED STATES PATENT OFFICE.

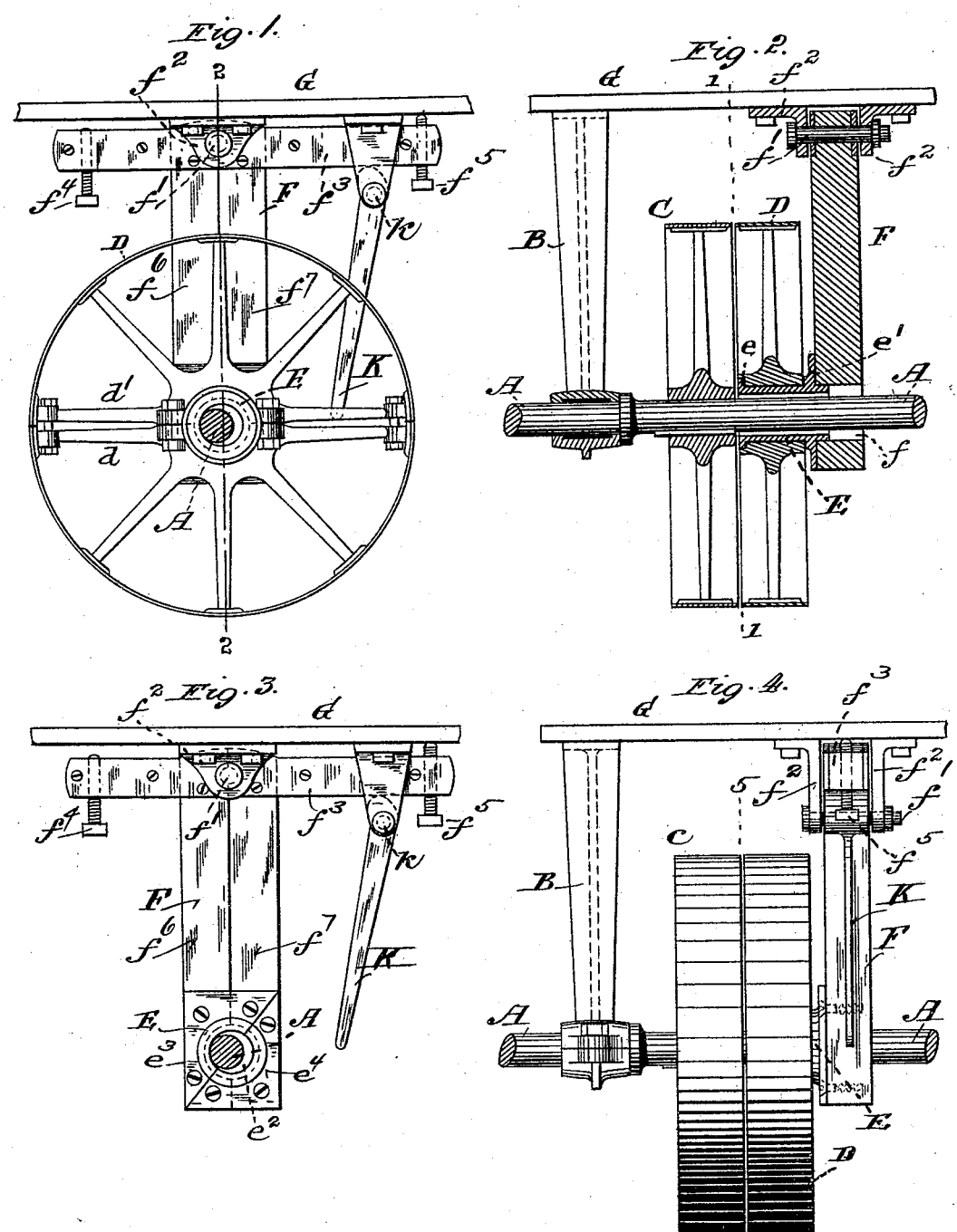

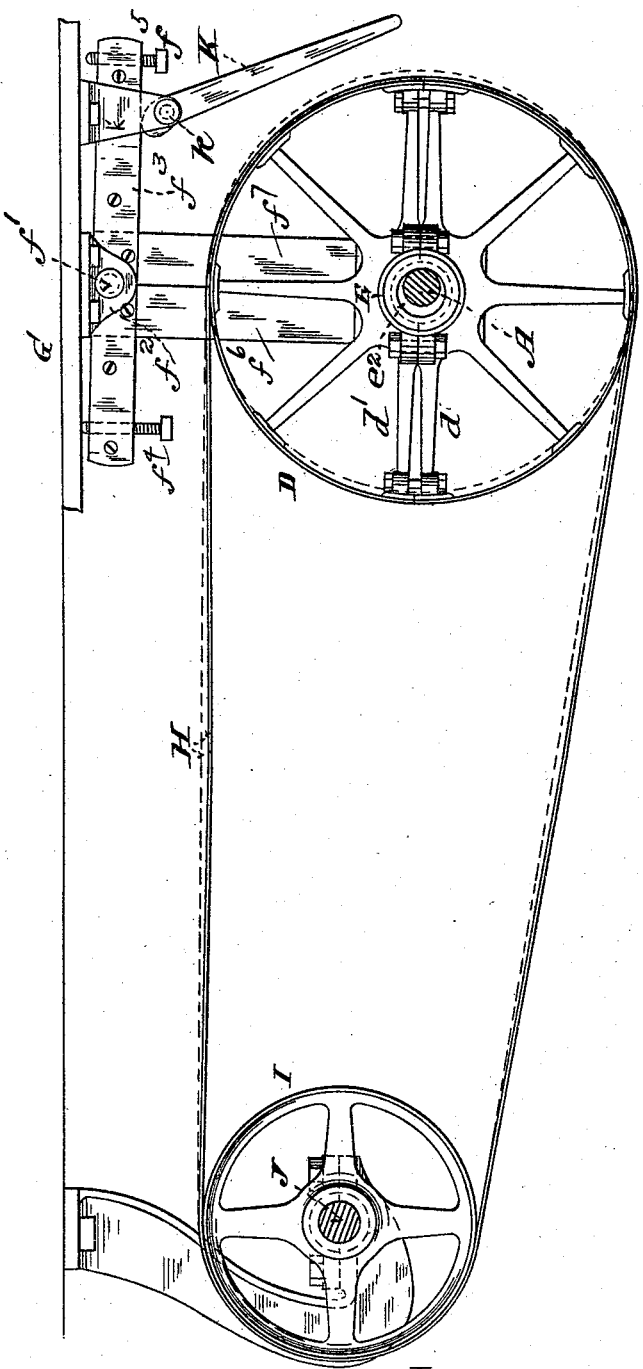

CONSTANT BAUMGARTEN, OF ST. LOUIS, MISSOURI.

BELT-HOLDER.

SPECIFICATION forming part of Letters Patent No. 492,738, dated February 28, 1893.

Application filed August 26, 1892. Serial No. 444,230. (No model.)

*To all whom it may concern:*

Be it known that I, CONSTANT BAUMGARTEN, of St. Louis, Missouri, have made a new and useful Improvement in Belt-Holders, of which the following is a full, clear, and exact description.

The present device is an improved means for supporting a belt when thrown off a driving pulley, it being a substitute for the customary loose pulley. It is desirable especially in that it obviates much of the wear which ordinarily comes upon a belt, as well as much of the wear and strain upon the shaft and shaft-bearings. It is also safer and more readily operated than is the mechanism hitherto in use.

It consists substantially as is hereinafter set forth and claimed, aided by the annexed drawings, making part of this specification, in which—

Figure 1 is a sectional side elevation of the improved mechanism, the section being on the line 1—1 of Fig. 2, which, in turn, is a section on the line 2—2 of Fig. 1, including the driving pulley and a shaft hanger: Fig. 3 a section on the line 1—1 of Fig. 2; omitting the belt-holder: Fig. 4 an elevation of the parts of Fig. 2: and Fig. 5 a side sectional elevation, the section being on the line 5—5 of Fig. 4, and showing the belt, and the driven pulley and its support.

The same letters of reference denote the same parts.

A represents a shaft.

B represents a hanger or other suitable means for sustaining the shaft.

C represents an ordinary pulley attached to the shaft in the ordinary way.

D represents the improved belt holder. It is in the form of a pulley, wheel, or drum, whose diameter is equal or thereabout to that of the pulley C along side of which it is arranged substantially as is shown.

The holder is mounted upon a bearing, E, which more or less, and preferably entirely, encircles the shaft A, but which is loose from the shaft, and which is, internally, of larger diameter than is the shaft, and partly to enable the bearing to be wholly free of the shaft so that the shaft can rotate without coming in contact with the bearing, and partly for an additional purpose presently described. The bearing is suitably shaped and supported to sustain the holder along side the pulley substantially as is indicated by its various positions shown in the drawings, and to that end it is supported by means of the hanger F, the bearing, as indicated in Figs. 3 and 4, being secured to the hanger, and the hanger in turn being attached to the plate G or other overhead support, and being suitably perforated or otherwise constructed at *f* to provide for the extension of the shaft A. That is, the essential feature of the improved construction is the supporting of a pulley, wheel or drum, as D, along side a pulley C in such a manner as to be rotatable, but at the same time wholly independent of the revolution of the shaft of said pulley C. Hence, if the shaft A, does not extend (to the right as seen in Fig. 2) beyond the pulley C, the bearing for the belt holder, as also the support for said bearing, need not be perforated. But if, as is apt to be the case, the shaft A is extended, the bearing and bearing-support are perforated, or otherwise constructed, to provide for the shaft-extension. The flanges, *e*, *e'*, upon the bearing E are a desirable means for confining the belt holder laterally in place.

The operation of the improvement, as thus far described is as follows: Let the belt, H, be running upon the pulley C, and it be desired to throw it off; the operator, by any suitable means not shown, shifts the belt from the pulley C onto the belt holder D; the belt, owing to the belt holder being independent of the shaft A, at once substantially becomes stationary, as do also the driven pulley I and its shaft J, and they remain stationary until the belt is shifted back again onto the driving pulley C.

The belt holder is loose upon the bearing to enable the shifting of the belt to and from the pulley C to be readily accomplished.

An additional feature of the improvement is the means for slackening the belt when thrown off the driving pulley. The support E is adapted, for this purpose, to be movable toward and from the driven pulley sufficiently to obtain the requisite slackness. And the most desirable mode of securing the described adjustment of the belt holder bearing is to make the hanger, F, to which said bearing is attached, adjustable. Accordingly the hanger F, is pivoted at *f'* to its support G; the support G is provided with suitable lugs or brackets $f^2, f^2$, through which the pivot-bolt, $f'$, passes substantially as shown, and the hanger F, is thereby enabled to be swung substantially as is indicated by its different positions, one of which is shown in Figs. 1 and 3, and the other one of which is shown in Fig. 5; the hanger is provided with an arm, $f^3$, and K represents a cam-lever pivoted at $k$ to a bracket $k'$; by turning the cam-lever into its position of Figs. 1 and 3 the arm $f^3$ is pried upward and the hanger F thereby adjusted and held to support the belt holder at its maximum distance from the driven pulley; but by turning the cam lever into its position of Fig. 5 the arm $f^3$ is released and the gravity of the parts causes the hanger F to swing, and the belt holder to be shifted to its minimum distance from the driven pulley, whereupon the belt is slackened and the tension upon the parts therewith connected relieved. The last named position is shown in the full lines in Fig. 5. The opening, $e^2$, in the bearing E, as also the opening, $f$, in the hanger F, is large enough to permit of the described adjustment of the belt holder. The position of the belt holder and belt before the described slackening is indicated by the broken lines in Fig. 5. Suitable stops, $f^4, f^5$, which are preferably in the form of the adjustable screws working through the arm $f^3$ serve to limit the described movement of the hanger in the described adjustment of the belt holder so as to prevent contact practically between the shaft A and the bearing E.

To enable the described belt holder and its support to be readily applied to the shaft A when extended as shown the belt holder is made in parts, $d, d'$, suitably united as shown, the bearing E is made in parts $e^3, e^4$, and the hanger F is made in parts $f^6, f^7$, substantially as shown.

I claim—

The combination of the shaft, the pulley, the belt-holder, the belt-holder bearing, the adjustable hanger, and the cam-lever, said bearing and bearing support encircling loosely said shaft, and said belt holder being loose upon said bearing, substantially as described.

Witness my hand this 24th day of August, 1892.

CONSTANT BAUMGARTEN.

Witnesses:
C. D. MOODY,
H. PERK.